United States Patent
Brombach

(10) Patent No.: US 11,994,110 B2
(45) Date of Patent: May 28, 2024

(54) METHOD FOR PROVIDING REACTIVE POWER

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/525,568

(22) Filed: Nov. 12, 2021

(65) Prior Publication Data

US 2022/0154694 A1 May 19, 2022

(30) Foreign Application Priority Data

Nov. 13, 2020 (EP) .................... 20207500

(51) Int. Cl.
*F03D 7/04* (2006.01)
*H02J 3/46* (2006.01)

(52) U.S. Cl.
CPC ............ *F03D 7/048* (2013.01); *F03D 7/047* (2013.01); *H02J 3/46* (2013.01); *H02J 2300/28* (2020.01)

(58) Field of Classification Search
CPC ........ F03D 7/048; F03D 7/047; F03D 7/0284; H02J 3/46; H02J 2300/28; H02J 3/50; H02J 3/18; H02J 3/16; H02J 13/00004; F05B 2270/1033; F05B 2270/335; F05B 2270/337; Y02E 10/76; Y02E 40/30
See application file for complete search history.

(56) References Cited

U.S. PATENT DOCUMENTS

| | | | |
|---|---|---|---|
| 2010/0067271 A1* | 3/2010 | Garces | H02J 3/1842 363/95 |
| 2012/0010755 A1 | 1/2012 | Stapelfeldt | |
| 2016/0028235 A1* | 1/2016 | Sun | H02J 3/18 700/298 |
| 2019/0055926 A1 | 2/2019 | Busker | |
| 2019/0267804 A1* | 8/2019 | Matan | G06Q 7/635 |
| 2021/0159702 A1* | 5/2021 | Nagakura | H02J 3/381 |
| 2022/0140604 A1* | 5/2022 | Patel | H02J 3/50 700/287 |

FOREIGN PATENT DOCUMENTS

| | | |
|---|---|---|
| DE | 10 2008 039 429 A1 | 2/2010 |
| DE | 10 2016 103 101 A1 | 8/2017 |
| WO | 2009/080036 A1 | 7/2009 |
| WO | 2012/028150 A2 | 3/2012 |
| WO | 2017/174085 A1 | 10/2017 |

* cited by examiner

*Primary Examiner* — Charles Cai
(74) *Attorney, Agent, or Firm* — Seed IP Law Group LLP

(57) ABSTRACT

Provided is a method for controlling an electrical installation, in particular a wind power installation or a wind farm. The method includes determining a specific location within an electrical supply network to which the electrical installation is electrically connected via the electrical supply network, determining an electrical variable which maps an electrical distance between the electrical installation and the specific location and ascertaining a potential reactive power of the electrical installation for the specific location depending on the electrical variable which maps an electrical distance between the electrical installation and the specific location.

13 Claims, 3 Drawing Sheets

METHOD FOR PROVIDING REACTIVE POWER

BACKGROUND

Technical Field

The present invention relates to a method for controlling an electrical installation, in particular a wind power installation, as well as to a method for controlling an electrical supply network.

Description of the Related Art

Electrical supply networks and the operational management thereof, in particular by way of a network operator, are commonly known.

Among other things, a sufficient reactive power or adequate reactive power compensation is required within an electrical supply network for proper operational management of the electrical supply network.

BRIEF SUMMARY

One or more embodiments are directed to providing reactive power in a simple manner for a network operator. Preferably, a prediction which is as accurate as possible of a technically possible reactive power is to be provided for a defined location.

A method for controlling an electrical installation, in particular a wind power installation or a wind farm, is thus proposed, comprising the steps: determining a specific location within an electrical supply network to which the electrical installation is electrically connected via the electrical supply network; determining an electrical variable which maps an electrical distance between the electrical installation and the specific location; ascertaining a potential reactive power of the electrical installation for the specific location depending on the electrical variable which maps an electrical distance between the electrical installation and the specific location.

In particular, a method for the technical aggregation of reactive power within an electrical supply network is therefore proposed, in which in particular a potential or technically possible reactive power of an electrical installation is determined for a specific location or point in the electrical supply network.

Herein, an electrical installation is in particular understood to mean combinations of electrical equipment which, as a whole or in individual parts, serve the application of electrical energy, i.e., in particular the generation, distribution and storing of energy. In particular, this is also to be understood to mean all those feeders, i.e., generators, storage devices and transducers, which are set up to exchange electrical power with an electrical supply network, in particular by means of a converter. The electrical installations described herein are therefore in particular wind power installations, photovoltaic installations, electrical storage devices and further converter-based network installations, such as static synchronous compensators (STATCOMS) or flexible alternating current transmission system (FACTS), for example, as well as combinations thereof.

In a first step of the method, a specific location within the electrical supply network is determined to which the electrical installation is electrically connected, for example via an electrical line of the electrical supply network.

In this case, the specific location is preferably a, in particular electrical, point within the electrical supply network, i.e., a specific section of an overhead line, a transformer, a transformer station, or the like, for example. In particular, the specific location is an electrical point which can be mapped in a network calculation and/or load flow study and/or power flow study.

Determining the specific location can take place by way of the electrical installation and/or by way of the network operator, for example. The network operator establishes that a section within the electrical supply network has a voltage which is too low and selects this section as a specific location, for example.

In one further step of the method, an electrical variable is determined which maps an electrical distance between the electrical installation and the specific location.

This electrical variable is preferably an, in particular effective, impedance between the electrical installation and the specific location, preferably an equivalent impedance between the electrical installation and the specific location. In particular, it is therefore proposed to take into account the electrically effective distance between the electrical installation and the specific location when providing the reactive power.

In this case, both determining the location and determining the electrical variable can take place both within the electrical installation and by way of the network operator. The electrical installation can even determine one, and the network operator the other.

In one preferred embodiment, the network operator determines both the location and the electrical variable and transmits at least the electrical variable to the electrical installation.

In one further step of the method, a technically possible or potential reactive power of the electrical installation is ascertained for the specific location depending on the electrical variable, for example using a simple two or four pole model or a model of a rigid network.

In particular, it is therefore proposed to ascertain the technically possible or potential reactive power taking into account the network topology.

In this case, ascertaining the potential reactive power preferably takes place by way of the electrical installation itself, in particular taking into account an operating point of the electrical installation.

The method preferably further comprises the step: transmitting the ascertained potential reactive power to a network operator.

In particular, it is therefore also proposed to provide the ascertained potential reactive power to the network operator, in particular so that the network operator can retrieve this ascertained potential reactive power in full if required from the electrical installation.

The method preferably further comprises the step: generating and feeding the potential reactive power into the electrical supply network.

It is therefore also further proposed to feed the ascertained potential reactive power into the electrical supply network, in particular if the network operator requests this.

Provided that the network operator requires the ascertained potential reactive power for voltage boosting at a specific location within the electrical supply network, for example, the network operator can retrieve or request this potential reactive power from the electrical installation. The electrical installation then generates this reactive power, which in particular is requested by the network operator, and then also feeds it into the electrical supply network.

It is also possible that the electrical installation has a 1.5 megavolt amps (reactive) (MVAr) reactive power control range, ascertains 1 MVAr as potential reactive power and reports it to the network operator, but the network operator only requires 0.5 MVAr and requests this from the electrical installation, for example.

In particular, it is therefore also proposed to determine a required reactive power for a specific location and to generate it at a different location. The reactive power which is generated and/or consumed by the electrical installation is therefore always greater than the reactive power which is required for the specific location in terms of amount.

In this respect, it is in particular also proposed to regulate to a specific point in the electrical supply network.

Ascertaining the potential reactive power preferably additionally takes place depending on an operating point of the electrical installation.

In particular, it is therefore also proposed to ascertain the potential reactive power taking into account the operating point of the electrical installation.

In particular, the potential reactive power is therefore to be understood as technically possible reactive power of the electrical installation, i.e., in particular the reactive power which the electrical installation would be prepared to provide for the electrical supply network. In one case, for example, the power converter of the electrical installation is therefore already utilized to 80 percent of the power converter nominal power as a result of active power feed-in. The electrical installation can then only provide 20 percent of the power converter nominal power as reactive power for the electrical supply network. In another case, there is a wind lull, for example, and the electrical installation in the form of a wind power installation cannot generate any electrical power at all and thus cannot generate any reactive power either, and in this respect also cannot provide any reactive power for the electrical supply network.

Determining the operating point of the electrical installation preferably takes place depending on a requested reactive power, in particular requested by a network operator.

In particular, it is therefore also proposed that when determining the operating point of the electrical installation, one or the reactive power requested by the network operator is also taken into account.

The network operator therefore in particular asks the electrical installation whether said electrical installation has the ability to provide a specific amount of reactive power due to the prevailing situation. The electrical installation takes this into account when ascertaining the reactive power.

In one embodiment of the method, the network operator therefore asks what amount of reactive power the electrical installation would be able to provide.

In a different embodiment of the method, the network operator asks whether a specific amount of reactive power could be provided by the electrical installation.

The specific location of a or the network operator of the electrical supply network is preferably specified.

In particular, it is therefore also proposed that the network operator ascertains the locations or points in the electrical supply network which require reactive power for voltage boosting or support. In addition, the network operator then further asks the electrical installations whether and/or to what extent they can participate in providing reactive power for this location.

The method described previously is preferably carried out by a wind power installation or a wind farm.

In particular, it is therefore proposed that the electrical installation is designed as a wind power installation and/or as a wind farm.

A method for controlling an electrical supply network is further proposed, comprising the steps: determining a location within the electrical supply network; specifying a reactive power set point for the specific location; optional: requesting a potential reactive power from at least one electrical installation for the specific location; receiving at least one or the potential reactive power for the specific location from at least one electrical installation; requesting a reactive power from the at least one electrical installation for the specific location depending on the specified reactive power set point and the at least one received potential reactive power.

In particular, it is therefore proposed that the network operator controls the electrical supply network by means of a technical aggregation of reactive power or the network operator carries out voltage boosting within the electrical supply network by means of technical aggregation of reactive power.

This takes place in particular by way of an open-loop method, in the case of which the network operator regulates to a specific location or point in the electrical supply network.

In this case, the method proposes in particular to take into account the electrically effective distance between the electrical installations and the specific location.

The electrical installations consequently always have a reactive power at their terminals which is different from the reactive power which is required at the specific location.

In particular, it is further proposed that in this case the network operator identifies locations for voltage support or boosting, determines a reactive power set point for these locations in such a way that the line voltage at this location is raised again into a normal range of 0.95 to 1.05 per unit (p.u.) of the nominal line voltage, for example, and, depending on this reactive power set point, requests reactive power from the electrical installations within the electrical supply network.

The electrical installations then correspondingly perform a method described herein.

The reactive power set point is preferably determined in such a way that a voltage boost occurs at the specific point within the electrical supply network.

This can result in the electrical installation feeding reactive power into the electrical supply network or extracting reactive power from the electrical supply network, depending on requirements.

The potential reactive power is preferably ascertained by means of a method described herein.

The specific location preferably has a line voltage which is below a nominal line voltage, in particular below 0.95 p.u. of the nominal line voltage.

The method described herein is therefore used in particular for locations or points in the electrical supply network which have an undervoltage, i.e., a voltage below the nominal voltage.

In this case, the line voltage is preferably below 0.95 p.u. of the nominal line voltage.

In this case, the line voltage is particularly preferably below 0.9 p.u. of the nominal line voltage.

In this case, the line voltage is still more preferably below 0.8 or 0.85 p.u. of the nominal line voltage.

Requesting the reactive power preferably takes place in an iterative method.

In particular, it is therefore proposed that the network operator and the electrical installation, for the aggregation of the reactive power, are in a constant exchange or iterative process in which both the network operator and the electrical installation update their requests and responses with regard to the reactive power.

An iterative process of this type can be carried out by means of or in a similar manner to a power flow study or load flow study, for example.

In particular, it is therefore also proposed to carry out the iterative method by means of a numerical analysis.

A wind power installation is further proposed, comprising: a control unit (e.g., controller) which is set up to carry out a method described herein, wherein the control unit has an interface which is set up to receive data from a network operator and/or to send data to the network operator.

A wind farm is further proposed, comprising: a wind farm control unit which is set up to carry out a method described herein, wherein the wind farm control unit has an interface which is set up to receive data from a network operator and/or to send data to the network operator.

BRIEF DESCRIPTION OF THE SEVERAL VIEWS OF THE DRAWINGS

The present invention is explained in greater detail hereinafter by way of example using exemplary embodiments with reference to the accompanying figures, wherein the same reference symbols are used for the same or similar components.

DETAILED DESCRIPTION

Figure 1:
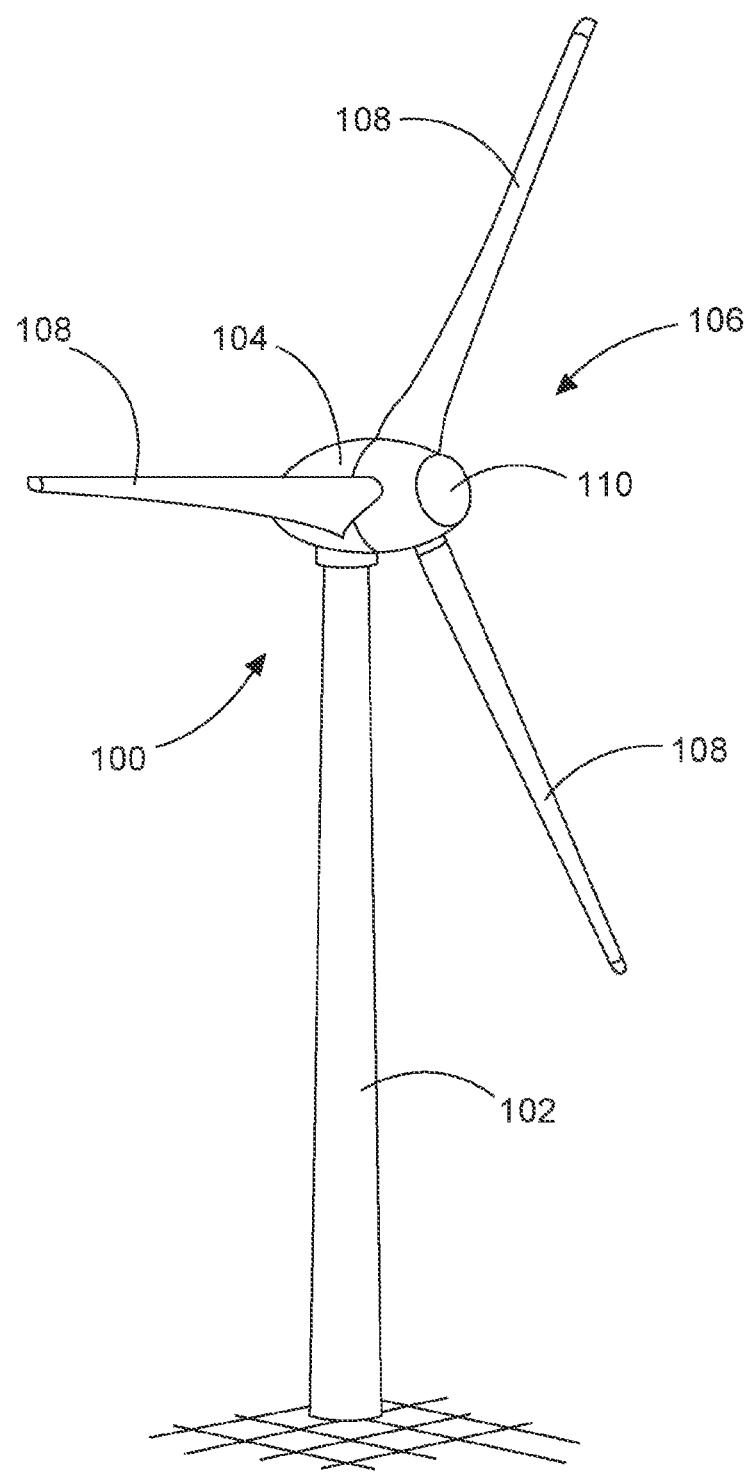
FIG. 1 shows a schematic view of a wind power installation according to one embodiment.

FIG. 1 shows a schematic view of a wind power installation 100 according to one embodiment.

The wind power installation 100 has a tower 102 and a nacelle 104.

An aerodynamic rotor 106 with three rotor blades 108 and a spinner 110 is arranged on the nacelle 104.

The rotor 106 is transferred into a rotational movement by the wind during operation and thus drives a generator in the nacelle 104.

The generator is further connected to a power converter described herein, by means of which the wind power installation exchanges electrical power with an electrical supply network.

In particular, the wind power installation is therefore designed as a converter-based feeder.

A control unit (e.g., controller) described herein is further provided for operating the wind power installation, and in particular the power converter, in particular in order to carry out and/or participate in a method described herein.

Figure 2A:
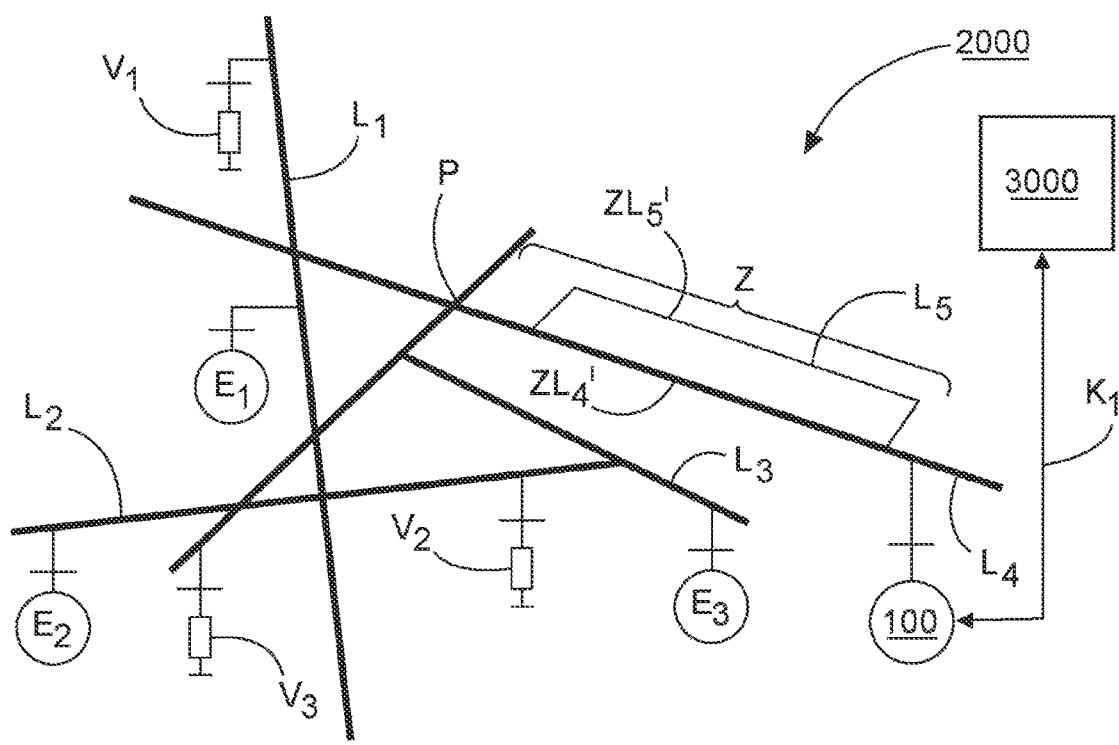
FIG. 2A shows a structure of an electrical supply network with a wind power installation according to one embodiment.

FIG. 2A shows a structure of an electrical supply network 2000 with a wind power installation 100 according to one embodiment.

The electrical supply network 2000 comprises a plurality of lines L1, L2, L3, L4, L5 as well as producers E1, E2, E3 and consumers V1, V2, V3 connected to these lines L1, L2, L3, L4, L5 and a wind power installation 100.

The wind power installation 100 is designed as described herein and is preferably representative of a wind farm 1000.

The electrical supply network 2000 is further operated by a network operator 3000 which is connected to the wind power installation 100 via a communication line K1, for example, in particular in order to exchange data.

In addition, the electrical supply network 2000 comprises a specific location P, preferably determined by the network operator 3000, at which in particular the actual voltage of the electrical supply network is to be raised by means of the wind power installation 100, for example because the specific location P has an undervoltage.

Between the specific location P, which is located on a nodal point of two electrical lines, for example, and the wind power installation 100, there is an electrical distance which can be reproduced (represented) by the impedance Z.

In this case, the, in particular effective, impedance Z is composed of the line impedance $z_{L4'}$ and the line impedance $z_{L5'}$. In particular, the partial parallel connection of the lines L4 and L5 ensures another, in particular effective, impedance Z between the specific location P and the wind power installation 100. In the present case, the effective impedance Z is thus smaller than the effective impedance Z shown in FIG. 2B.

There may also be a mesh network between the specific location and the electrical installation. In such a case, the effective impedance Z of the mesh network is then to be considered for the method described herein.

In order to raise the actual voltage of the electrical supply network 2000 at the specific location P by means of the wind power installation 100, the method described herein is carried out.

Figure 2B:
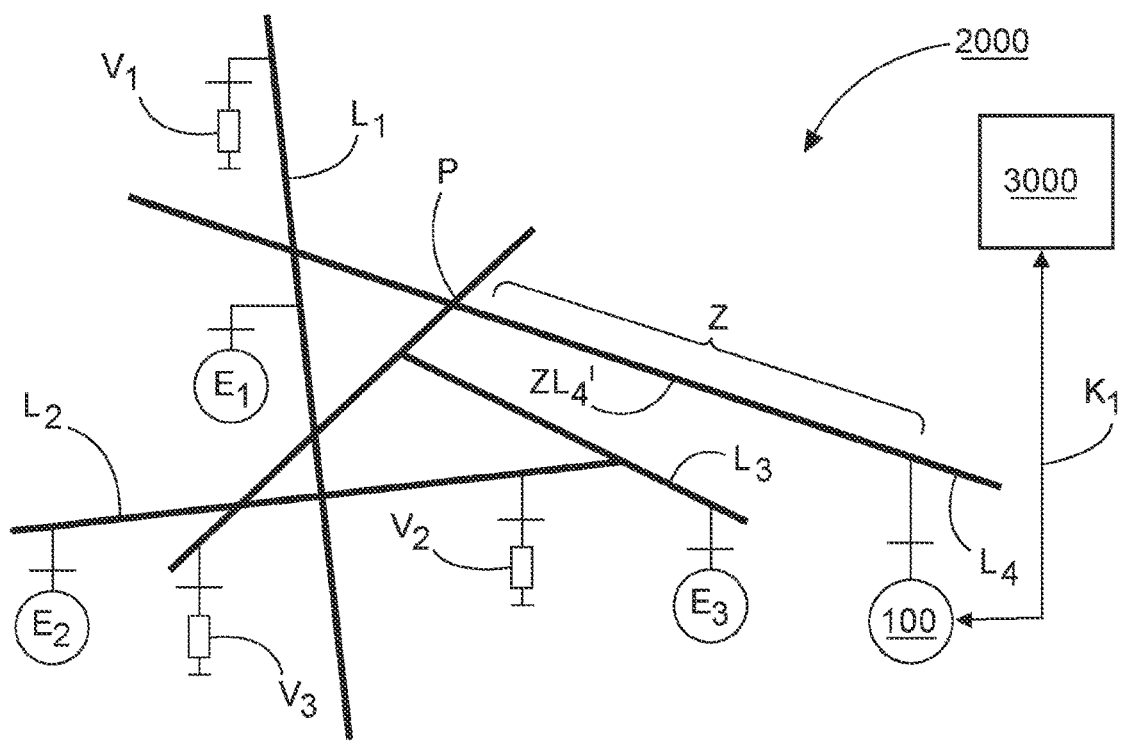
FIG. 2B shows a further structure of an electrical supply network with a wind power installation according to one embodiment.

FIG. 2B shows a further structure of an electrical supply network 2000 with a wind power installation 100 according to one embodiment.

The electrical supply network 2000 comprises a plurality of lines L1, L2, L3, L4 as well as producers E1, E2, E3 and consumers V1, V2, V3 connected to these lines L1, L2, L3, L4 and a wind power installation 100.

The wind power installation 100 is designed as described herein and is preferably representative of a wind farm 1000.

The electrical supply network 2000 is further operated by a network operator 3000 which is connected to the wind power installation 100 via a communication line K1, for example, in particular in order to exchange data.

In addition, the electrical supply network 2000 comprises a specific location P, preferably determined by the network operator 3000, at which in particular the actual voltage of the electrical supply network is to be raised by means of the wind power installation 100, for example because the specific location P has an undervoltage.

Between the specific location P, which is located on a nodal point of two electrical lines, for example, and the wind power installation 100, there is an electrical distance which can be reproduced by the impedance Z.

In this case, the, in particular effective, impedance Z is composed of the line impedance $z_{L4'}$.

In order to raise the actual voltage of the electrical supply network 2000 at the specific location P by means of the wind power installation 100, the method described herein is carried out.

Figure 3:
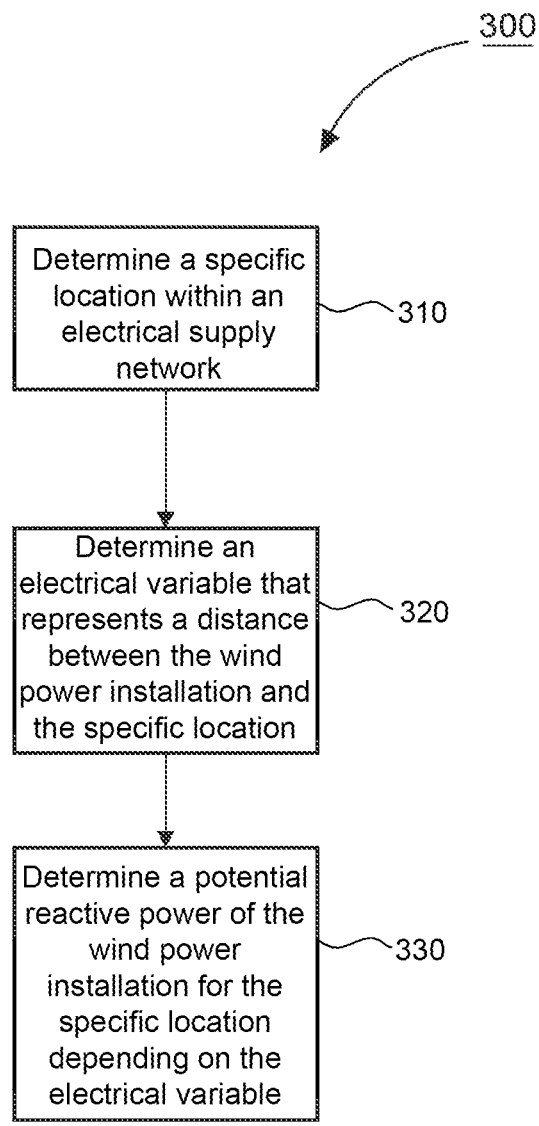
FIG. 3 shows a schematic sequence of a method for controlling a wind power installation in one embodiment.

FIG. 3 shows a schematic sequence 300 of a method for controlling a wind power installation 100 in one embodiment.

In a first step 310, a specific location P within an electrical supply network 2000 is determined to which the wind power installation 100 is electrically connected via the electrical supply network, for example via an electrical line L4.

In one further step 320, an electrical variable, in particular an (effective) impedance Z, is determined which maps an electrical distance between the wind power installation and the specific location P.

In one further step 330, a potential reactive power of the wind power installation is then ascertained for the specific location P depending on the electrical variable, in particular the impedance Z.

This potential reactive power ascertained in this way can then be transmitted to a network operator of the electrical supply network, for example, which can retrieve the potential reactive power if required from the wind power installation or the operator of the wind power installation, for example in order to raise the actual voltage of the electrical supply network at the specific location P.

The communication between the wind power installation 100 and the network operator 3000 can take place in a wired or wireless manner, for example.

The wind power installation has a control unit described previously for communicating with the network operator 3000, for example.

Furthermore, the method described previously can also be carried out with a wind farm. In such a case, the wind farm has a wind farm control unit (e.g., wind farm controller), for example, with which the network operator can then communicate.

In this case, the method described previously is particularly well suitable for a, preferably technical, aggregation of electrical power, in particular electrical reactive power, preferably in wind power installations or wind farms.

The method described previously is therefore particularly well suitable for:
- an aggregation of a plurality of wind farms to form a renewable power plant;
- a network control of the electrical supply network during normal operation;
- a network control of the electrical supply network during critical network situations;
- a voltage control of a network operator of the electrical supply network;
- an optimized power flow controller of a network operator of the electrical supply network, in particular in the case of methods in which reactive power is required, in particular for voltage setting.

LIST OF REFERENCE SYMBOLS 100 wind power installation
102 tower, in particular of a wind power installation
104 nacelle, in particular of a wind power installation
106 aerodynamic rotor, in particular of a wind power installation
108 rotor blade, in particular of a wind power installation
110 spinner, in particular of a wind power installation
300 sequence of a method for controlling an electrical installation
310 determining a specific location
320 determining an electrical variable
330 ascertaining a potential reactive power
1000 wind farm
2000 electrical supply network
3000 network operator, in particular of the electrical supply network
E1, E2, E3 producers, in particular of the electrical supply network
K1 communication line, in particular of the network operator
L1, L2 . . . electrical lines, in particular of the electrical supply network
L3, L4, L5 electrical lines, in particular of the electrical supply network
P specific location, within the electrical supply network
V1, V2, V3 consumers, in particular of the electrical supply network
Z impedance, in particular of an electrical distance
$z_{L4'}$, $z_{L5'}$ line impedance The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling an electrical installation, comprising:
   determining a specific location within an electrical supply network to which the electrical installation is electrically connected via the electrical supply network;
   determining an electrical variable which represents a distance in the electrical supply network between the electrical installation and the specific location;
   determining a potential reactive power of the electrical installation for the specific location depending on the electrical variable;
   transmitting the determined potential reactive power to a network operator; and
   controlling the electrical installation based on the potential reactive power,
   wherein the electrical installation is a wind power installation or a wind farm,
   wherein the specific location is specified by the network operator of the electrical supply network.

2. The method for controlling the electrical installation as claimed in claim 1, wherein the electrical variable is an impedance between the electrical installation and the specific location.

3. The method for controlling the electrical installation as claimed in claim 2, wherein the impedance is an effective impedance.

4. The method for controlling the electrical installation as claimed in claim 2, wherein the impedance is an equivalent impedance between the electrical installation and the specific location.

5. The method for controlling the electrical installation as claimed in claim 1, comprising:
   generating and feeding the determined potential reactive power into the electrical supply network.

6. The method for controlling the electrical installation as claimed in claim 1, comprising:
   determining the potential reactive power depending on an operating point of the electrical installation.

7. The method for controlling the electrical installation as claimed in claim 6, comprising:
   determining the operating point of the electrical installation depending on a requested reactive power.

8. The method for controlling the electrical installation as claimed in claim 7, wherein the requested reactive power is requested by the network operator.

9. The method for controlling the electrical installation as claimed in claim 1, comprising:
   determining the potential reactive power using iterative requests and responses by the network operator and the electrical installation.

10. The method for controlling the electrical installation as claimed in claim 1, wherein the method is performed by a wind power installation or a wind farm.

11. A wind power installation, comprising:
   a controller configured to perform the method as claimed in claim 1, wherein the controller is configured to receive data from the network operator and/or send data to the network operator.

12. A wind farm, comprising:
   a wind farm controller configured to perform the method as claimed in claim 1, wherein the wind farm controller is configured to receive data from the network operator and/or send data to the network operator.

13. A method for controlling an electrical installation, comprising:
   determining a specific location within an electrical supply network to which the electrical installation is electrically connected via the electrical supply network;
   determining an electrical variable which represents a distance in the electrical supply network between the electrical installation and the specific location;
   determining a potential reactive power of the electrical installation for the specific location depending on the electrical variable, wherein determining the potential reactive power uses iterative requests and responses by a network operator and the electrical installation,
   transmitting the determined potential reactive power to the network operator; and
   controlling the electrical installation based on the potential reactive power,
   wherein the electrical installation is a wind power installation or a wind farm.

\* \* \* \* \*